(12) United States Patent
Gallucci

(10) Patent No.: US 6,291,574 B1
(45) Date of Patent: Sep. 18, 2001

(54) POLYESTER MOLDED ARTICLES

(75) Inventor: Robert R. Gallucci, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/442,722

(22) Filed: Nov. 18, 1999

Related U.S. Application Data

(60) Provisional application No. 60/151,229, filed on Aug. 27, 1999.

(51) Int. Cl.$^7$ .................................................... C08L 67/02
(52) U.S. Cl. ...................... 524/505; 524/409; 524/411; 524/412; 524/423; 524/513; 525/64; 525/92 E; 525/92 F
(58) Field of Search ................................... 525/92 F, 64, 525/92 E; 524/505, 513, 409, 411, 412, 423

(56) References Cited

U.S. PATENT DOCUMENTS

| | | |
|---|---|---|
| 2,465,319 | 3/1949 | Whinfield et al. . |
| 2,999,835 | 9/1961 | Goldberg . |
| 3,038,365 | 6/1962 | Peterson . |
| 3,047,539 | 7/1962 | Pengilly . |
| 3,153,008 | 10/1964 | Fox . |
| 3,334,154 | 8/1967 | Kim . |
| 4,001,184 | 1/1977 | Scott . |
| 4,022,748 | 5/1977 | Schlichting et al. . |
| 4,034,013 | 7/1977 | Lane . |
| 4,090,966 | 5/1978 | Clendenen . |
| 4,092,202 | 5/1978 | Bergk et al. . |
| 4,122,061 | 10/1978 | Holub et al. . |
| 4,123,436 | 10/1978 | Holub et al. . |
| 4,131,575 | 12/1978 | Adelmann et al. . |
| 4,257,937 | 3/1981 | Cohen et al. . |
| 4,271,064 | 6/1981 | Dieck . |
| 4,636,544 | 1/1987 | Hepp . |
| 4,987,194 | * 1/1991 | Maeda ................................. 525/314 |
| 5,441,997 | 8/1995 | Walsh et al. . |
| 5,502,199 | 3/1996 | Angerbauer et al. . |
| 5,886,094 | 3/1999 | Sanada . |
| 5,910,540 | * 6/1999 | Takahashi ........................ 525/92 B |
| 5,922,816 | 7/1999 | Hamilton . |

FOREIGN PATENT DOCUMENTS

| | | |
|---|---|---|
| 2533139 | 2/1976 | (DE) . |
| 19645727 | 5/1997 | (DE) . |
| 0765914 | 4/1997 | (EP) . |
| 01180456 A | 7/1989 | (JP) . |
| 5194821 | 8/1993 | (JP) . |
| 6293854 | 10/1994 | (JP) . |
| 7331044 | 12/1995 | (JP) . |
| 8012832 | 1/1996 | (JP) . |
| 2000178429 | 6/2000 | (JP) . |
| WO 8000972 | 5/1980 | (WO) . |

* cited by examiner

Primary Examiner—Patricia A. Short

(57) ABSTRACT

A moldable polyester composition comprising a sound damping amount of an isoprenoid rubber modifier.

1 Claim, No Drawings

POLYESTER MOLDED ARTICLES

This application claims rights of priority from U.S. Provisional Patent Application Serial No. 60/151,229, filed Aug. 27, 1999, which is hereby incorporated by reference.

FIELD OF THE INVENTION

The invention relates to polyester molded articles having enhanced sound and vibration damping.

BACKGROUND OF THE INVENTION

It is desirable to provide enclosures for mechanical devices, such as fans, switches, compressors and other devices, to suppress vibration and sound associated with the operation of the device.

Holub et al, U.S. Pat. No. 4,122,061 describes polyester reinforced blends of poly(1,4-butylene terephthalate) and poly(ethylene terephthalate) impact modified with the addition of a polyolefin or olefin based copolymer resin. The polyolefinic resin is dispersed into the polyester blend and used for injection molding. Workpieces molded from such polyester resins are described as having a high degree of surface hardness and abrasion resistance, high gloss, and lower surface friction. It is desirable to provide further enhancements to the properties of resins of the type described in Holub et al.

U.S. Pat. No. 5,441,997 describes polyester molding compositions which have ceramic like qualities, can be molded into relatively thin sections, and have high impact strength. The composition is directed to a polybutylene terephthalate and/or polyethylene terephthalate and an aromatic polycarbonate with inorganic fillers selected from the group consisting of barium sulfate, strontium sulfate, zirconium oxide and zinc sulfate. If desired, a styrene rubber impact modifier is described as an added ingredient to the composition as well as a fibrous glass reinforcing filler. Although these compositions are suited for applications where ceramic like qualities are desired, compositions having additional enhanced properties are desirable.

Various rubbery modifiers have been added to polyesters to improve impact. U.S. Pat. No. 4,022,748 discloses rubber elastic graft copolymers having a glass transition below −20° C. U.S. Pat. No. 4,034,013 and 4,092,202 disclose multistage polymers having a rubbery interior and a hard outer shell preferably derived from acrylates. U.S. Pat. No. 4,090,966 and 4,271,064 disclose selectively hydrogenated monoalkenyl arene-diene block copolymers as polyester modifiers. U.S. Pat. No. 4,257,937 describes polyester polycarbonate blends with polyacrylate resins. A wide variety of other polyester impact modifiers have been disclosed in the art, but none address the issue of sound and vibration damping along with retention of a good balance of mechanical and rheological properties.

Vibration damping has been addressed through the use of specific styrenic block copolymers in other thermoplastics such as ethylene-polypropylene as described in Jpn. Kokai Tokkyo Koho JP11 80,456[99 804561]: (Chem Abstracts 130: 238309). U.S. Pat. No. 5,886,094 discloses an inorganic filler with a compatibilizer and styrene block copolymer; in a polyphenylene ether polyamide mixture to increase damping.

Despite all prior work combining thermoplastic polyesters and rubbery impact modifiers there still remains the need to provide a crystalline thermoplastic polyester with high heat, solvent resistance and good mechanical and rheological properties having the additional characteristic of sound and vibration damping.

BRIEF SUMMARY OF THE INVENTION

The invention relates to a moldable thermoplastic polyester composition comprising a sound damping amount of a monoalkenyl arene isoprenoid rubber modifier having a high level of 1,2 or 3,4 linkages. The isoprenoid rubber modifiers may be used alone, in combination with other non isoprenoid impact modifiers, or with fillers, reinforcements, flame retardants or other thermoplastics, especially polycarbonate.

DETAILED DESCRIPTION OF THE INVENTION

The sound damping component as used in the compositions of the present invention are rubbery monoalkenyl arene-isoprenoid copolymers of high-molecular weight. Typical isoprenoid natural and synthetic polymeric materials have elasticity at room temperature with a high level of 1,4 linkages a few, if any, 1,2 or 3,4 linked diene units. To enhance sound and vibration damping capability as required for the invention herein described, the majority of isoprene units should be linked primarily though the 1,2 or 3,4 bond. Traditional impact modifiers using diene based rubbers have primarily 1,4 type linkages and show little if any sound and/or vibration damping behavior when used in the blends of the invention. Sound and vibration damping isoprenoid materials may include copolymers, including random, block, radial block, graft and core-shell copolymers as well as combinations thereof.

Sound and vibration damping isoprenoid AB(diblock), ABA (triblock) copolymers of alkenylaromatic and diene compounds comprising isoprene blocks are most effective. The conjugated diene blocks, having a high level of 1,2 or 3,4 linkages, may be partially or entirely hydrogenated. The preferred conjugated diene is isoprene. The preferred vinyl aromatic compounds are styrene and methyl styrene. Examples of triblock copolymers of this type are polystyrene-polyisoprene-polystyrene (SIS). The most preferred isoprene monoalkenyl arene copolymers of the invention will have sufficient monoalkenyl arene content to keep them from agglomerating at room temperature but still have high isoprenoid content for efficient sound and vibration damping. This is achieved with usually greater than 15–30 wt. % monoalkenyl arene content. The remainder of the sound and vibration damping rubber is comprised of 70–85 wt. % poly isoprenoid units. Partially hydrogenated isoprene monoalkenyl copolymers may be preferred for conditions requiring the isoprenoid rubber to withstand higher temperatures.

The sound damping additive is preferably present in the blends of the invention in an amount from about 3 to about 50%, preferably from 5 to about 20 percent by weight.

The most preferred isoprenoid rubber is a styrene isoprene styrene (SIS) or hydrogenated SIS block (hSIS) copolymer where the isoprene linkages are primarily 1,2 or 3,4 linkages. Sound damping rubber of this type is marketed by Kuraray Co. under the HYBRAR trademark. Usually about more than 50% of the isoprene linkages should be 1,2 or 3,4 linkages with the remainder of the isoprene linkages being 1,4 linkages. The preferred SIS or hydrogenated SIS copolymer will have about 20% styrene units with the remainder comprised of poly isoprene units.

Mixtures of different types of sound damping rubbers may be used. The mixtures may be especially useful in extending the temperature range under which the compositions of the invention will show sound or vibration damping capability.

Sound and vibration damping behavior can be seen in the dynamic mechanical performance of the composition as enhanced tan. delta or loss modulus values between −20 to +20° C. as well as by simply dropping the sample on a hard flat surface and rating the sound reduction compared to a control with no sound and vibration damping rubber (SVDR).

Suitable polyester components include crystalline polyesters such as polyesters derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

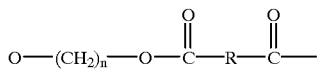

wherein n is an integer of from 2 to 6. R is a C6–C20 aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"). PET is preferred for economic reasons. PBT is desirable to use for rapid crystallization. Blends of PBT and PET may be used to obtain enhanced surface properties.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component of at least 70 mol %, preferably at least 80 mol %, of which consists of tetramethylene glycol and an acid component at least 70 mol %, preferably at least 80 mol %, of which consists of terephthalic acid, and polyester-forming derivatives thereof.

The glycol component is preferred to contain not more than 30 mol %, preferably not more than 20 mol %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component is preferred to contain not more than 30 mol %, preferably not more than 20 mol %, of another acid such as isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxy benzoic acid, sebacic acid, adipic acid and polyester-forming derivatives thereof.

Blends of polyesters may also be employed in the composition. As indicated earlier, preferred polyesters are poly(ethylene terephthalate) and poly(1,4-butylene terephthalate). When blends of these preferred components are employed the polyester resin component can comprise from about 1 to about 99 parts by weight poly(ethylene terephthalate) and from about 99 to about 1 part by weight poly(1,4-butylene terephthalate) based on 100 parts by weight of both components combined. Preferred are 1:1 to 3:1 blends of FBT to PET.

The polyester component of the sound and vibration damping composition of the invention is present in amounts from about 5 to about 95, preferably from about 20 to about 60 percent by weight based on the total weight of the composition.

Polycarbonate resins may be used in preparing the blends of the present invention. Amorphous aromatic polycarbonate resin is utilized in a suitable amount for enhancing impact, heat distortion or dimensional stability of the final resin.

Typically polycarbonates are prepared by reacting a dihydric phenol with a carbonate precursor, such as phosgene, a haloformate or a carbonate ester. Generally speaking, such carbonate polymers may be typified as possessing recurring structural units of the formula

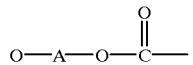

wherein A is a divalent aromatic radical of the dihydric phenol employed in the polymer producing reaction. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2 hydroxyphenyl) methane; bis(4-hydroxyphenyl) methane; bis(4-hydroxy-5-nitrophenyl) methane; 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl) sulfone; bis(3,5-diethyl-4-hydroxyphenyl)sulfone; 2,2-bis(3,5-dimethyl-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonates are disclosed in U.S. Pat Nos. 2,999,835; 3,038,365; 3,334,154; and 4,131,575. These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid- terminated polyester or with a dibasic acid (in the event a carbonate copolymer or interpolymer rather than a homopolymer is desired) for use in the preparation of the polycarbonate mixtures of the invention. Branched polycarbonate resins are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl) propane (bisphenol-A), commercially available under the trade designation LEXAN Registered TM from General Electric Company.

The instant polycarbonates are high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography. The polycarbonate resins may use a variety of different end groups to enhance performance. Bulky mono phenols, such as dicumyl phenol, are preferred.

Resin blends of the invention may include polycarbonate from 0 to 80 percent by weight and preferably from about 10 to about 50 percent by weight.

When combining polycarbonate with polyester it is very desirable to use special stabilizers, often referred to a quenchers, to suppress polycarbonate polyester reaction. The stabilizers are used at a level of 0.01–10 weight percent and preferably at a level of from 0.05–2 weight percent of the entire mixture. The stabilizers for polycarbonate polyester blends include an effective amount of an acidic phosphate salt; an acid, alkyl, aryl or mixed phosphite having at least one hydrogen or alkyl group; a zinc phosphate salt; a phosphorous oxo acid, a metal acid pyrophosphate or a mixture thereof. Silicone phosphate esters as well as alkyl and aryl othro silicates are also effective quenchers as described in U.S. Pat. Nos. 5,922,816 and 5,502,199 herein incorporated by reference. The suitability of a particular compound for use as a polycarbonate polyester blend stabilizer, and the determination of how much is to be used as a stabilizer, may be readily determined by preparing a mixture of the polyester component and the polycarbonate without the particular compound and determining the effect on melt viscosity or color stability or the formation of interpolymers. These stabilizers are further described in U.S. Pat. No. 5,441,997 to Walsh in column 6, line 48 to column 7, line 10. This text is incorporated by reference into the present application.

The resin blend may optionally include from 0 to about 30, of a vinyl aromatic-vinyl cyanide copolymer. The preferred SAN composition comprises 15 to 30, more preferably 25–28, percent by weight acrylonitrile (AN) with the remainder styrene, para-methyl styrene, or alpha methyl styrene. The vinyl cyanide compound includes acrylonitrile and substituted vinyl cyanides such a methacrylonitrile. Preferably the copolymer is a styrene-acrylonitrile copolymer (SAN). The SAN may be further modified by grafting to a rubbery substrate such as a 1,4-polybutadiene to produce a rubber graft polymer. High rubber content (>50wt. %) resin of this type (HRG-ABS) may be especially useful for impact modification of polyester resins and their polycarbonate blends.

Other rubbery impact modifiers may be used in combination with the SVDR. Preferred modifier are core shell impact modifiers made via emulsion polymerization using alkyl acrylate, styrene and butadiene. Most preferred are methymethacrylate-butadiene-styrene (MBS) and methymethacrylate-butylacrylate core shell rubbers.

To provide desired stiffness, the compositions may desirably contain a mineral filler, glass fiber reinforcing agent or a combination of the two. The filamentous glass to be employed as a reinforcing agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass, however other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 to about 20 microns, but this is not critical to the present invention. It is known, however to those skilled in the art, that smaller filament diameters will also increase the strength. Glass loadings of from 3–50 wt. % are preferred for the sound and vibration damping compositions of this invention.

It is further often desirable to employ an inorganic filler in the thermoplastic resin to impart a series of additional beneficial properties, not the least of which are thermal stability, increased density, and modulus. Examples of mineral fillers include, clay, talc, wollastonite, mica, silica, glass beads, alumina and metal oxides. Inorganic fillers which provide a ceramic-like feel are preferably used in the present invention. Included in the compositions of the present invention are metal sulfate salts as a filler material . Barium sulfate which is non-toxic and insoluble in dilute acids is especially preferred. Barium sulfate may be in the form of the naturally occurring barytes or as synthetically derived barium sulfate using well known synthetic techniques. The particle size may vary from 0.5 to 50 microns, preferably from 1 to 15 microns and most preferably 8 microns. Barium sulfate is particularly desirable for imparting a heavy ceramic like feel to the injection molded article.

When present the mineral maybe used at 5–80% by weight of the whole formulation.

The compositions of the present invention can also comprise a wide variety of other additives, such as UV stabilizers, pigments, colorants, plasticizers, processing aids, antioxidants and the like. Such components are added in effective amounts to impart the desired properties on the compositions of the present invention for the specific application.

It is preferable to use stabilizers such as: a hindered phenol, thioester, phosphite or phosphonite stabilizer, alone or in combination, in conjunction with the SVDR to allow for improved stability when processing with high melting polyester and polycarbonate resins as well as for good stability on oven aging.

Additional desirable additives may include flame retardants and drip suppressants. It is important that additional ingredients be stable at polyester processing temperatures. Flame-retardant additives may be present in an amount sufficient to reduce the flammability of the polyester resin, preferably to a UL94 V-0 rating. The amount will vary with the nature of the resin and with the efficiency of the additive.

Typical halogenated aromatic flame-retardants include polybromophenyl ethers, brominated polyepoxide, brominated imides, brominated polycarbonate, poly (haloaryl acrylate), poly (haloaryl methacrylate), or mixtures thereof. Examples of such suitable flame retardants are brominated BPA epoxy resins, brominated polystyrenes such as polydibromostyrene and polytribromostyrene, decabromobiphenyl ethane, tetrabromobiphenyl, brominated alpha, omega -alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals. Other aromatic carbonate flame retardants are set forth in U.S. Pat. NO. 4,636,544 to Hepp. Halogented flame retardants (FR) can be used at 3–40% depending on halogen content and desired FR rating.

The flame retardants are typically used with a synergist, particularly inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics.

As used herein and in the appended claims, the term "weight percent" means the percent by weight of each component based on the total weight of respective composition.

The following examples illustrate the present invention, but are not meant to be limitations to the scope thereof.

The formulations shown below were pre blended and extruded on an extruder. Samples were run on a vacuum vented single or twin screw extruder 250–275° C. 100–300 rpm.and molded on an injection molding machine at 250–270° C. set temp, 30 sec cycle and a mold temperature of 150–190° C.

Improved sound and vibration damping is shown by two methods. Dynamic mechanical analysis (DMA) were run on 1/8×1/2×3 in. molded bars at 1 hertz with a 3° C./min. heating rate. Increases in tan. delta and loss modulus between –20 and +20° C. indicate improved damping performance. Loss modulus is measured in mega pascals (MPa)

A practical comparative test was also used to measure sound damping. In the examples sound ranking, on a 1–5 scale, is the relative reduction in sound when a 4×1/8 in. disc is dropped onto a table from a height of two feet. A sound ranking value of 1 means same sound as the control while 5 indicates a significantly muted sound.

Other properties were evaluated using standard ASTM test procedures. N Izod=notched Izod impact, UN Izod= unnotched Izod impact. MV=melt viscosity in posie.

The styrene isoprenoid rubbery sound and vibration damping copolymers used in this work are available from the Kurary Co. under the HYBRAR trade name. HYBRAR brand 5127 (most preferred) has 21% styrene (S), 79% isoprene (I) >50% of which is 1,2 or 3,4 bonded, to form a SIS triblock copolymer. HYBRAR 5125 has 20% styrene 80% polyisoprene with the polyisoprene units having >50% 1,2 or 3,4 linkages. HYBRAR 7125 is a partially hydrogenated version of HYBRAR 5125 where the diene derived double bonds have been reduced. The SIS 5127 (SVDR-1) has a rubber block Tg=7° C. the SIS 5125 (SVDR-2) has a –17° C'. Tg and the hSIS 7125 (SVDR-3) has –14° C. Tg. These rubbers all have a polystyrene block Tg between 95–1050° C.

EXAMPLES 1–3
Controls A–B (Table 1)

Ingredients as listed in Table 1 were extruded and molded into test parts in a PBT matrix. The SVD rubbers Ex. 1,2,3 gave improved sound damping vs. the PBT alone (control A) or PBT with a conventional styrene-ethylenebutylene-styrene (SEBS) block copolymer rubber, for example KRATON G from the Shell Co. (Control B).

TABLE 1

Examples 1–3, Control A-B
Polyester Blends

| Examples | A 15094-1 | 1 15094-2 | 2 15094-3 | 3 15094-4 | B 15094-5 |
|---|---|---|---|---|---|
| PBT 315 | 89.65 | 79.65 | 79.65 | 79.65 | 79.65 |
| PBT 195 | 10 | 10 | 10 | 10 | 10 |
| SVDR-1 | 0 | 0 | 0 | 10 | 0 |
| SVDR-2 | 0 | 0 | 10 | 0 | 0 |
| SVDR-3 | 0 | 10 | 0 | 0 | 0 |
| SEBS | 0 | 0 | 0 | 0 | 10 |
| Stab. | 0.35 | 0.35 | 0.35 | 0.35 | 0.35 |
| MV @ 250° C. | 4700 | 4600 | 4400 | 4500 | 6700 |
| UN Izod ft-lbs/in | 35.4 | 29.6 | 26.5 | 28.9 | 30.8 |
| Flex Str. Kpsi | 12 | 9.9 | 9.9 | 9.9 | 9.5 |
| Flex Mod. Kpsi | 325 | 270 | 270 | 270 | 260 |
| Tens. Str. Kpsi | 8.1 | 7.0 | 7.0 | 7.0 | 6.6 |
| % Elong. | 115 | 50 | 70 | 90 | 130 |
| Sound Rating | 1 | 4 | 5 | 5 | 2 |

Stab. = 0.25% Olefin wax, 0.15% IRGANOX 1076 hindered phenol from Ciba Geigy Co.
SVDR-1 = Kurarary HYBRAR SIS 5125
SVDR-2 = Kurarary HYBRAR SIS 5127
SVDR-3 = Kurarary HYBRAR hSIS 7125
SEBS = KRATON G1651 from Shell Co.

EXAMPLES 4–8
Control C (Table 2)

The following blends were extruded with 30–35% chopped fiber glass and an aliphatic epoxy stabilizer along with a hindered phenol antioxidant . The SVD rubbers are very effective in increasing damping between –10 and +10° C. as well as increasing the sound damping rating vs. the control with no rubber (Control C). Note that the mixture of two SVD rubbers, Ex.6 & 7, give good damping values at both –10 and +10° C. as seen by the tan. delta and loss modulus values.

TABLE 2

Examples 4–8, control C
Glass Filled Polyester Blends

| Examples | C 14996-1 | 4 14996-2 | 5 14996-3 | 6 15464-1 | 7 15464-2 | 8 15412-2 |
|---|---|---|---|---|---|---|
| PBT | 68 | 58 | 58 | 53.05 | 43.05 | 54.85 |
| Fiber Glass | 30 | 30 | 30 | 35 | 35 | 35 |
| Epoxy | 1.8 | 1.8 | 1.8 | 1.8 | 1.8 | 0 |
| SVDR-1 | 0 | 10 | 0 | 5 | 10 | 10 |
| SVDR-3 | 0 | 0 | 10 | 5 | 10 | 0 |
| Stab. | 0.2 | 0.2 | 0.2 | 0.15* | 0.15* | 0.15* |
| MV @ 250° C. | 20100 | 12900 | 12200 | 13700 | 15600 | 14700 |

TABLE 2-continued

Examples 4–8, control C
Glass Filled Polyester Blends

| Examples | C<br>14996-1 | 4<br>14996-2 | 5<br>14996-3 | 6<br>15464-1 | 7<br>15464-2 | 8<br>15412-2 |
|---|---|---|---|---|---|---|
| UN Izod ft-lbs/in | 14.7 | 12.5 | 10.7 | 13.0 | 12.1 | 14.7 |
| Flex Str. Kpsi | 24.7 | 18.2 | 18.2 | 23.3 | 16.7 | 24.6 |
| Flex Mod. Kpsi | 920 | 720 | 700 | 1008 | 814 | 1077 |
| Tens. Str. Kpsi | 15 | 11.4 | 11.9 | 13.7 | 9.8 | 14.8 |
| % Elong. | 7 | 8 | 8 | 6 | 7 | 5 |
| Sound Rating | 1 | 3 | 4 | 4 | 5 | 5 |
| Loss Modulus 10° C. Mpa | Nr | Nr | Nr | 165 | 150 | 185 |
| Loss Modulus –10° C. Mpa | Nr | Nr | Nr | 185 | 200 | 75 |
| Tan. Delta 10° C. | Nr | Nr | Nr | 0.039 | 0.057 | 0.04 |
| Tan. Delta –10° C. | Nr | Nr | Nr | 0.044 | 0.062 | 0.016 |

Stab. = 0.05% sodium stearate, 0.15% IRGANOX 1076 from Ciba Geigy
Stab.* = 0.05% sodium stearate, 0.1% IRGANOX 1010 from Ciba Geigy
SVDR-1 = Kuraray SIS HYBRAR 5127
SVDR-3 = Kuraray HYBRAR h-SIS 7125
PBT = GE VALOX 85:15 mixture 315:195
Epoxy = ERL4221 cycloaliphatic epoxy from Union Carbide

EXAMPLES 9–11

Control D (Table 3)

These glass filled blends contain a brominated aromatic polycarbonate flame retardant with antimony trioxide synergist and PTFE antidrip in a PBT matrix. The SVD rubber Hybrar 5127 improves the sound rating and increased damping as seen by a higher tan. delta values and a higher loss modulus. Note that an Underwriters Laboratory (UL)-94 V-0 rating can still be retained even with the added SVD rubber showing good ignition resistance.

TABLE 3

Examples 9–11, Control D;
Glass Filled Flame Retardant Polyester Blends

| Examples | D<br>15331-1 | 9<br>15331-2 | 10<br>15331-3 | 11<br>15331-4 |
|---|---|---|---|---|
| PBT | 44 | 34 | 34 | 29 |
| Fiber Glass 14 micron | 30 | 30 | 0 | 0 |
| Fiber Glass 11 micron | 0 | 0 | 30 | 35 |
| Bromo PC:PBT 85:15 | 22 | 22 | 22 | 22 |
| $Sb_2O_3$:EVA 85:15 | 3 | 3 | 3 | 3 |
| SVDR-1 | 0 | 10 | 10 | 10 |
| SAN-PTFE 1:1 | 0.5 | 0.5 | 0.5 | 0.5 |
| Stab. | 0.5 | 0.5 | 0.5 | 0.5 |
| MV @ 250° C. | 12800 | 13700 | 14100 | 15400 |
| UN Izod ft-lbs/in | 10.8 | 10.1 | 10.5 | 10.1 |
| Flex Str. Kpsi | 25.1 | 22 | 23.5 | 24 |
| Flex Mod. Kpsi | 1154 | 951 | 1008 | 1117 |
| Tens. Str. Kpsi | 15.8 | 13.2 | 14.2 | 14.8 |
| % Elong. | 3 | 4 | 4 | 4 |
| UL-94 1/16 in. | V-0 | V-0 | V-0 | V-0 |
| UL-94 1/8 in. | V-0 | V-2 | V-0 | V-0 |
| Sound Rating | 1 | 5 | 5 | 5 |
| Loss Modulus 10° C. Mpa | 78 | Nr | Nr | 220 |
| Loss Modulus –10° C. Mpa | 69 | Nr | Nr | 110 |
| Tan. Delta 10° C. | 0.02 | Nr | Nr | 0.045 |
| Tan. Delta –10° C. | 0.015 | Nr | Nr | 0.022 |

Stab. = 0.4% mono calcium phospbate 0.1%, IRGANOX 1010 from Ciba Geigy
SVDR-1 = Kuraray SIS HYBRAR 5127
PBT = GE VALOX 50 mixture 315:195
bromo-PC:PBT = 85% [1:1 BrBPA: BPA PC copoly.] 15% PBT
EVA = 93:7 ethylene vinyl acetate copolymer.

EXAMPLE 12

Control E–G (Table 4)

PBT-PET blends with a mineral filler; barium sulfate show that the SVD rubber (Ex.12) is more effective at sound reduction than other copolymer rubbers: copolyether polyester PEE (available from DuPont Co. as HYTREL 4056 (Ex. G) and SEBS (Ex. F) while improving impact over the control with no rubber (Ex. E). (Nr=not run)

TABLE 4

Example 12, Controls E, F, G:
Mineral Filled Polyester Blends

| Examples | E<br>15202-1 | F<br>15202-2 | G<br>15202-3 | 12<br>15202-4 |
|---|---|---|---|---|
| PBT | 34.7 | 27.7 | 27.7 | 27.7 |
| PET | 15 | 12 | 12 | 12 |
| BaSO4 | 50 | 50 | 50 | 50 |
| SEBS | 0 | 10 | 0 | 0 |
| SVDR-1 | 0 | 0 | 0 | 10 |
| PEE | 0 | 0 | 10 | 0 |
| UN Izod ft-lbs/in | 6.5 | 15.3 | 20.6 | 12.4 |
| Flex Str. Kpsi | 13.8 | 9.1 | 9.5 | 9.2 |
| Flex Mod. Kpsi | 618 | 439 | 396 | 392 |
| Specific Gravity | 2.003 | 1.901 | 1.983 | 1.913 |
| Sound Rating | 1 | 2 | 2 | 5 |

PBT = 70:30 PBT Valox 315:195
All had 0.1% IRGANOX 1010 hindered phenol antioxidant
PEE = Dupont HYTREL polyester polyether
SVDR-1 = Kuraray SIS HYBRAR 5127
SEBS = KRATON 1651 from Shell co.

EXAMPLE 13

Controls H–J (Table 5)

A PBT blend with a High Rubber Graft ABS (70% butadiene rubber) is made with the SVDR-1 rubber (Ex. 13). The sound rating is improved compared to controls with either the HRG-ABS (Ex. H) or combinations of HRG-ABS with SEBS or polyester-co-polyether; PEE (Ex. I & J). HRG-ABS is available from General Electric Co. as BLENDEX brand 338

TABLE 5

Example 13, Controls H–J:
Impact Modified PBT Blends

| Examples | H<br>15204-1 | 13<br>15204-2 | I<br>15204-3 | J<br>15204-4 |
|---|---|---|---|---|
| PBT | 79.3 | 79.3 | 79.3 | 79.3 |
| HRG-ABS | 20 | 10 | 10 | 10 |
| SEBS | 0 | 0 | 0 | 10 |
| SVDR-1 | 0 | 10 | 0 | 0 |
| PEE | 0 | 0 | 10 | 0 |
| Stab. & release | 0.7 | 0.7 | 0.7 | 0.7 |
| % Elong | 119 | 65 | 128 | 64 |
| Ten. Str. Kspi | 5.2 | 5.1 | 5.1 | 5.1 |
| Hex Str. Kpsi | 8.1 | 8.2 | 7.8 | 7.8 |
| Flex Mod. Kpsi | 232 | 232 | 219 | 227 |
| Specific Gravity | 1.216 | 1.212 | 1.237 | 1.215 |
| Sound Rating | 1 | 5 | 2 | 2 |

PBT = 70:30 PBT VALOX 315:195
Stab = 0,3% IRGANOX 1076. 0.1% IRGAPHOS 168, 0.3% pentaerythritol tetrastearate
PEE = Dupont HYTREL 4046 polyester polyether
SVDR-1 = Kuraray SIS HYBRAR 5127
SEBS = Shell KRATON G 1651
HRG-ABS = BLENDEX 338 from GE Plastics

EXAMPLES 14–16

Control K (Table 6)

Blends of PBT and BPA polycarbonate are prepared with an MBS modifier and SVD rubber -2 and -3. Note that in Ex. 14 and 16 in addition to improved sound rating the use of SVDR-2 or a combination of SVDR-3 with MBS gives improved Izod impact compared to SVDR-3 alone.

TABLE 6

Examples 14–16, Control K:
Polyester Polycarbonate Blends

| Examples | K<br>14918-1 | 14<br>14918-2 | 15<br>14918-3 | 16<br>14918-4 |
|---|---|---|---|---|
| PBT | 39 | 39 | 39 | 39 |
| PC | 50 | 50 | 50 | 50 |
| MBS EXL3691 | 10.5 | 5.25 | 0 | 0 |
| SVDR-2 | 0 | 0 | 0 | 10.5 |
| SVDR-3 | 0 | 5.25 | 10.5 | 0 |
| Stab. | 0.5 | 0.5 | 0.5 | 0.5 |
| MV @ 250° C. | 13300 | 12700 | 10200 | 9400 |
| N Izod ft-lbs/in | 14.1 | 14.5 | 3.9 | 12.4 |
| Flex Str. Kpsi | 11.8 | 11.4 | 10.5 | 10 |
| Flex Mod. Kpsi | 298 | 289 | 283 | 279 |
| Tens. Str. Kpsi | 7.7 | 7.5 | 7.4 | 7.3 |
| % Elong. | 100 | 130 | 50 | 60 |
| Sound Rating | 1 | 3 | 4 | 5 |

Stab = 0.1% mono zinc phosphate, 0.2 IGAPHOS 168, 0.2 IRGANOX 1076 from Ciba Geigy
SVDR-2 = Kuraray SIS HYBRAR 5125
SVDR-3 = Kuraray HYBRAR h-SIS 7125
PBT = GE VALOX 315
PC = 60:40 Mixture of GE LEXAN 105 and HF resins
M135 = EXL3691 from Rohm & Haas Co.

EXAMPLES 17–20

Control L (Table 7)

PBT-BPA-PC blends with SVDR-1 with a benzotriazole UV stabilizer and various levels of MBS modifier showing improved sound rating and good ductility and elongation compared to the blend with no SVDR.

TABLE 7

Examples 17–20, Control L:
Impact Modified Polycarbonate Polyester Blends

| Examples | L<br>15382-1 | 17<br>15382-2 | 18<br>15318-1 | 19<br>15318-2 | 20<br>15318-3 |
|---|---|---|---|---|---|
| PBT 315 | 39.7 | 34.7 | 38.7 | 36.7 | 34.7 |
| PC 105 | 29 | 26 | 30 | 28 | 26 |
| PC HF | 20 | 18 | 20 | 19 | 18 |
| MBX EXL3691 | 10 | 10 | 0 | 5 | 10 |
| TINUVIN 234 | 0.5 | 0.5 | 0.5 | 0.5 | 0.5 |
| SVDR-1 | 0 | 10 | 10 | 10 | 10 |
| Mono Zinc Phosphate | 0.1 | 0.1 | 0.1 | 0.1 | 0.1 |
| Stab. | 0.7 | 0.7 | 0.7 | 0.7 | 0.7 |
| N Izod ft-lbs/in | 15.5 | 15.5 | 7.7 | 15.1 | 15.5 |
| Flex Str. Kpsi | 11.3 | 9.2 | 11.1 | 10.1 | 9.0 |
| Flex Mod. Kpsi | 286 | 227 | 279 | 251 | 224 |
| Tens. Str. Kpsi | 7.2 | 5.7 | 7.3 | 6.5 | 5.9 |
| % Elong. | 89 | 93 | 125 | 233 | 230 |
| HDT @ 66 psi ° C. | 110 | 109 | Nr | Nr | 100 |
| Sound Rating | 1 | 5 | 5 | 5 | 5 |
| Loss Modulus 10° C. Mpa | Nr | Nr | Nr | Nr | 60 |
| Loss Modulus –10° C. Mpa | Nr | Nr | Nr | Nr | 38 |
| Tan. Delta 10° C. | Nr | Nr | Nr | Nr | 0.044 |
| Tan. Delta –10° C. | Nr | Nr | Nr | Nr | 0.021 |

Stab. = 0.4% SEENOX Thioester from Witco Co., 0.1% IRGANOX 1010 hindered phenol, 0.2% IRGAPHOS 168 aryl phosphite from Ciba Geigy Co.
SVDR-1 = Kuraray SIS HYBRAR 5127
PBT = GE VALOX 315
T-234 = TINUVIN 234 benzotriazole from Ciba Geigy Co.

EXAMPLE 21

Controls M–N (Table 8).

These blends illustrate the improved sound rating in mineral fiber glass mixtures in a PBT-PET-PC resin matrix by use of SVDR-3. Note that the SVDR is more effective in improving damping than the related SEBS rubber.

TABLE 8

Example 21, Controls M–N:
Glass Mineral Filled Polyester Polycarbonate Blends

| Examples | M<br>14797-1 | N<br>14797-2 | 21<br>14797-3 |
|---|---|---|---|
| PBT | 33 | 26.4 | 26.4 |
| PET | 17 | 13.6 | 13.6 |
| BaSO$_4$ | 30 | 30 | 30 |
| Fiber Glass | 15 | 15 | 15 |
| PC | 5 | 5 | 5 |
| SEBS | 0 | 10 | 0 |
| SVDR-3 | 0 | 0 | 10 |
| UN Izod ft-lbs/in | 10.5 | 12.7 | 12.2 |
| Flex Str. Kpsi | 20.7 | 15.8 | 16.5 |
| Flex Mod. Kpsi | 1000 | 755 | 728 |
| Sp. G. | 1.854 | 1.735 | 1.697 |
| Sound Rating | 1 | 2 | 5 |
| Loss Modulus 10° C. Mpa | 62 | 53 | 80 |
| Loss Modulus –10° C. Mpa | 65 | 55 | 230 |
| Tan. Delta 10° C. | 0.013 | 0.014 | 0.021 |
| Tan. Delta –10° C. | 0.014 | 0.015 | 0.05 |

All blends had 0.3% mono zinc phosphate stabilizer
SEBS = Shell SEBS KRATON G 1651
SVDR-3 = Kurrary HYBRAR hSIS 7125
PBT = GE VALOX 315
PC = GE LEXAN 105

What is claimed is:
1. A shaped polyester resin molded article consisting essentially of (a) from about 20 to about 60 percent by weight, based on the total weight, of a polyalkylene terephthalate, said polyalkylene terephthalate comprises a poly(1,4-butylene terephthalate) and a poly(ethylene terephthalate) in ratio 1:1 to 3:1 of said poly(1,4-butylene terephthalate) to said poly(ethylene terephthalate); (b) from about 5 to about 20 percent by weight, based on the total weight, of a styrene-isoprene-styrene block copolymer having isoprene linkages which are primarily 1,2 or 3,4 linkages; (c) a filler consisting essentially of 3 to 50 percent by weight glass fiber or 5 to 80 percent by weight mineral; (d) a sufficient amount of a halogenated flame retardant and a synergist whereby said molded article has a UL94 V-0.

* * * * *